United States Patent
Misek (10) Patent No.: US 7,738,019 B2
(45) Date of Patent: Jun. 15, 2010

(54) SYSTEM AND METHOD FOR PROVIDING AUTOMATIC GAIN CONTROL IN AN IMAGING DEVICE

(75) Inventor: Brian J. Misek, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 802 days.

(21) Appl. No.: 11/545,912

(22) Filed: Oct. 11, 2006

(65) Prior Publication Data

US 2008/0088716 A1    Apr. 17, 2008

(51) Int. Cl.
H04N 3/14 (2006.01)
H04N 5/335 (2006.01)

(52) U.S. Cl. ....................................... 348/297

(58) Field of Classification Search ................. None
See application file for complete search history.

(56) References Cited

U.S. PATENT DOCUMENTS

| 5,909,026 | A | * | 6/1999 | Zhou et al. ............... 250/208.1 |
| 6,593,560 | B2 | | 7/2003 | Misek |
| 6,784,939 | B1 | | 8/2004 | Lee |
| 2004/0251399 | A1 | | 12/2004 | Misek |
| 2005/0253944 | A1 | * | 11/2005 | Olsen et al. .................. 348/297 |

FOREIGN PATENT DOCUMENTS

| JP | 2149079 | 6/1990 |
| JP | 3287143 | 12/1991 |

* cited by examiner

Primary Examiner—Justin P Misleh (57) ABSTRACT

A system and method of providing automatic gain control (AGC) in an imaging device uses accumulated signals stored in active pixels of an image sensor during an exposure period to derive a shutter value for subsequent image capture.

16 Claims, 5 Drawing Sheets

SYSTEM AND METHOD FOR PROVIDING AUTOMATIC GAIN CONTROL IN AN IMAGING DEVICE

BACKGROUND OF THE INVENTION

Most conventional automatic gain control (AGC) circuits in optical navigation products use image statistics from the image that is currently being processed for navigation. Typically, the minimum pixel value and the maximum pixel value along with the average pixel value of the image sensor array for the current image are observed. Using these observed values, the exposure time and/or the illumination drive are then adjusted, if needed, to improve the next image.

The above AGC approach works well in optical computer mice and other imaging devices in which the image frames are acquired much quicker than the changes in the surface/scene illumination level. However, this AGC approach does not work well for imaging devices in which the image-to-image illumination level changes by a significant amount because the anticipated illumination level could be incorrect. In such instances, the image information may not be optimized, or worse yet, may be lost. In optical computer mice, this means that the tracking will degrade or fail all together.

In optical navigation products, the delay between the images was kept small enough to ensure only a small amount of the image could change, and the anticipated exposure would be sufficiently close to allow the navigation sensor to accurately track the surface changes. This requires the frame rate to be high, and results in a high number of images being acquired and processed, which in turn causes energy to be expended. In portable devices, this limits the battery life that can be achieved. In conventional optical computer mice, battery life was conserved by monitoring the amount of time the computer mouse was inactive, and the frame rate was gradually reduced as the period of inactivity increased. These Reset/Sleep modes would ratchet down the number of frames per second (FPS) to save power. When the mouse was moved, the highest frame rate would then be executed and the AGC would be adjusted until an acceptable image exposure was reached. Only when the acceptable image exposure was reached would tracking begin.

Although the above power saving technique works well for its purpose, there is a need for a system and method for providing ACG in an imaging device that can further reduce the amount of power being expended during operation.

SUMMARY OF THE INVENTION

A system and method for providing automatic gain control (AGC) in an imaging device uses accumulated signals stored in active pixels of an image sensor during an exposure period to derive a shutter value for subsequent image capture. The stored electrical signals in the active pixels are indicative of the average intensity of light incident on the image sensor. Thus, the derived shutter value will likely result in proper exposure during the subsequent image capture.

An AGC system in accordance with an embodiment of the invention comprises an image sensor, an integration circuit, a comparator and a counter. The image sensor includes a plurality of active pixels. Each of the active pixels comprise a photosensitive device configured to generate an electrical signal in response to impinging light and a storage device electrically connected to the photosensitive device to store an accumulated signal of the electrical signal during an exposure period. The integration circuit includes an output transistor electrically connected to the storage device of each of the active pixels to receive a combined signal of the accumulated signal stored in the storage device of each of the active pixels. The output transistor is connected to produce a comparison signal corresponding to the combined signal. The comparator is connected to the integration circuit to receive the comparison signal. The comparator is configured to compare the comparison signal with a threshold signal. The counter is operably connected to the comparator. The counter is configured to measure the duration for the comparison signal to become equal to the threshold signal. The duration is used to derive a shutter value for the subsequent image capture.

An AGC system in accordance with another embodiment of the invention comprises an image sensor, an integration circuit, a comparator and a counter. The image sensor includes a plurality of active pixels. Each of the active pixels comprise a phototransistor configured to generate an electrical signal in response to impinging light and a storage transistor electrically connected to the phototransistor to store an accumulated signal of the electrical signal during an exposure period. The integration circuit includes an output transistor electrically connected to the storage transistor of each of the active pixels to receive a combined signal of the accumulated signal stored in the storage transistor of each of the active pixels. The output transistor is connected to produce a comparison signal corresponding to the combined signal. The comparator is connected to the integration circuit to receive the comparison signal. The comparator is configured to compare the comparison signal with a threshold signal. The counter is operably connected to the comparator. The counter is configured to measure the duration for the comparison signal to become equal to the threshold signal. The duration is used to derive a shutter value for the subsequent image capture.

A method for providing AGC in an imaging device in accordance with an embodiment of the invention comprises accumulating an electrical signal in response to impinging light at each of active pixels of an image sensor during an exposure period to produce an accumulated signal, producing a comparison signal in response to a combined signal of the accumulated signal from each of the active pixels, and comparing the comparison signal with a threshold signal, including measuring the duration for the comparison signal to become equal to the threshold signal. The duration being used to derive a shutter value for the subsequent image capture.

Other aspects and advantages of the present invention will become apparent from the following detailed description, taken in conjunction with the accompanying drawings, illustrated by way of example of the principles of the invention.

DETAILED DESCRIPTION

Figure 1:
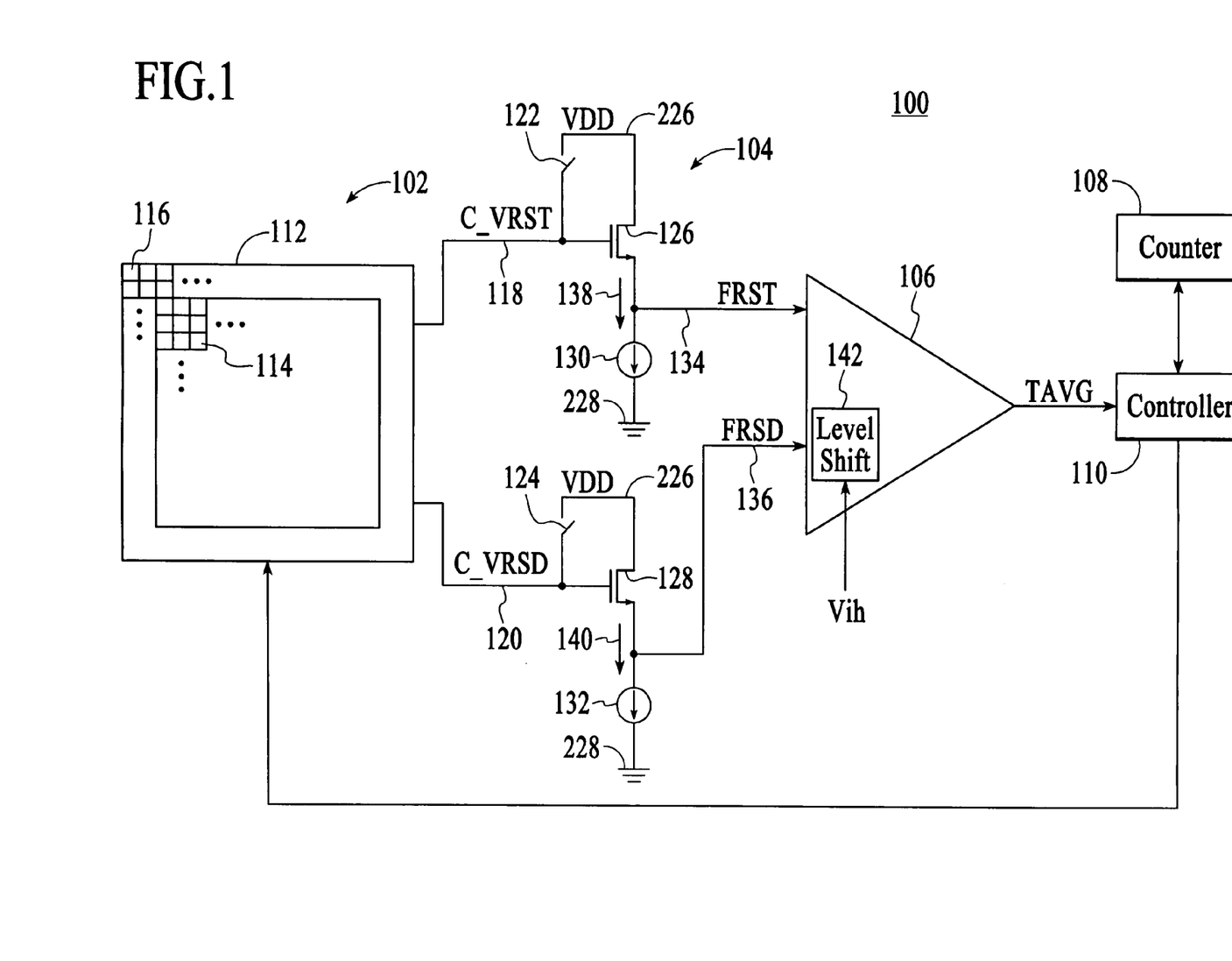
FIG. 1 is a diagram of an automatic gain control (AGC) system in accordance with an embodiment of the invention.

With reference to FIG. 1, an automatic gain control (AGC) system 100 in accordance with an embodiment of the invention is described. The AGC system 100 is described herein as being implemented in an optical navigation sensor. However, the AGC system 100 may be implemented in other optical imaging devices. As shown in FIG. 1, the AGC system 100 includes an image sensor 102, an integration circuit 104, a comparison block 106, a counter 108 and a controller 110. As described in more detail below, the AGC system 100 operates to determine a count value, which is indicative of the average intensity light incident on the image sensor 102. This count value is then used to derive a shutter value for subsequent image capture to ensure that a proper exposure period is used.

The image sensor 102 includes an array 112 of active photosensitive pixels 114. Each active photosensitive pixel 114 is configured to generate an accumulated electrical signal in response to incident light for each exposure period. Thus, these active photosensitive pixels 114 are used to sequentially capture frames of images, which can be used, for example, to track movements of a computer mouse over a surface. The array 112 may also include a ring of dummy photosensitive pixels 116 that surround the active photosensitive pixels 114. The dummy pixels 116 are placed in the array 112 to present the outermost active pixels 114 with the same surrounding physical structures as the other active pixels of the array, thereby increasing the matching of all active pixels of the array. The dummy pixels 116 also absorb any carriers that are generated outside the array 112. The thickness of the dummy pixel ring can be varied. As an example, the dummy pixel ring may be one to ten pixels thick.

Figure 2:
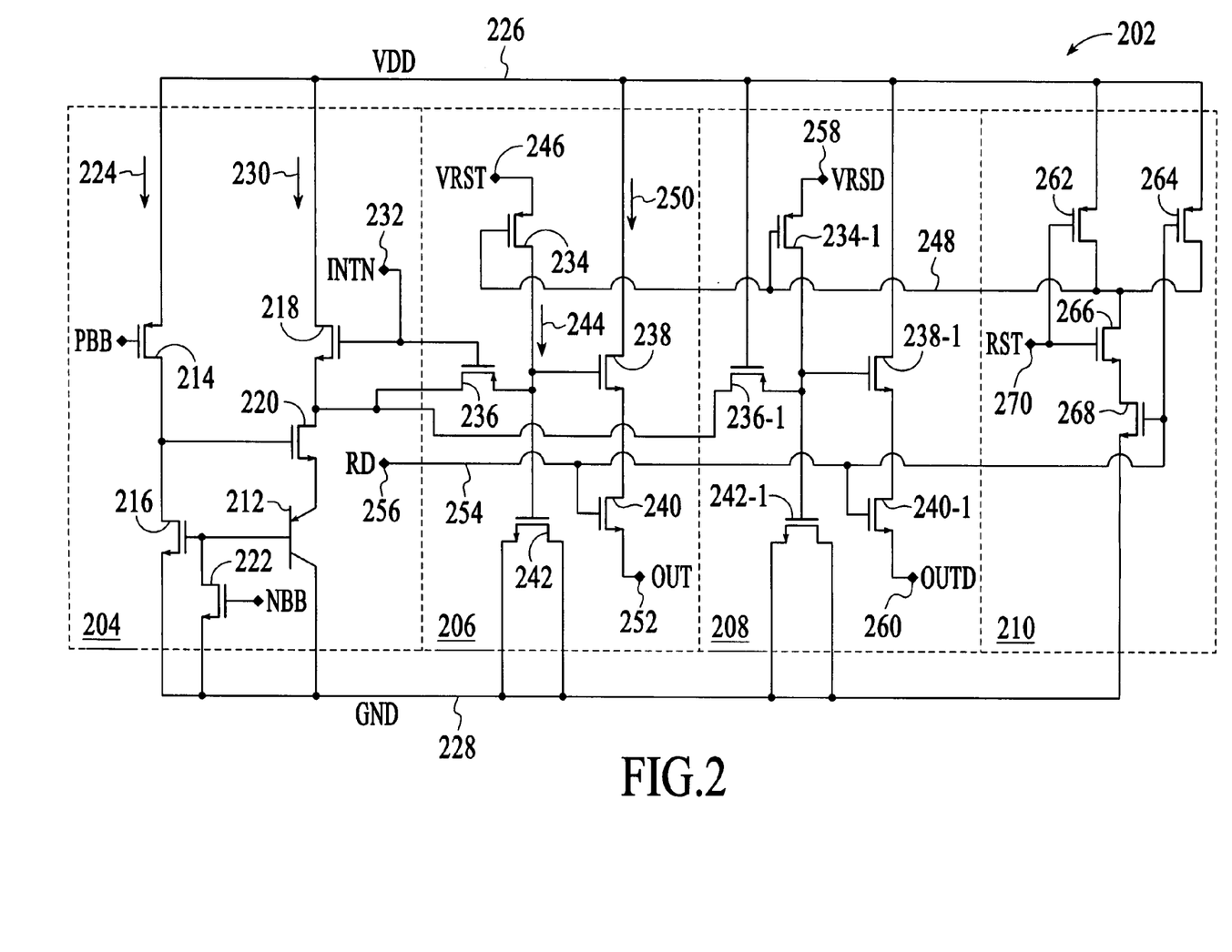
FIG. 2 is a circuit diagram of a photosensitive pixel of the AGC system in accordance with an embodiment of the invention.

Turning now to FIG. 2, a photosensitive pixel 202 included in the array 112 of the image sensor 102 in accordance with an embodiment of the invention is shown. Depending on the location of the pixel 202 in the array 112 of the image sensor 102, the pixel 202 may be an active pixel or a dummy pixel. As illustrated in FIG. 2, the pixel 202 includes a light-to-current conversion section 204, a light signal section 206, a dark signal section 208 and an NAND gate section 210. The light-to-current conversion section 204 operates to generate current in response to incident light. The light signal section 206 operates to accumulate and store the generated current during an integration or exposure period to produce an image signal. The dark signal section 208 operates to accumulate and store reference current during the same exposure period to produce a reference signal. The NAND gate section 210 operates to activate and deactivate various electrical components of the dark and light signal sections 206 and 208 to facilitate various operations of the pixel 202.

The light-to-current conversion section 204 includes a phototransistor 212 and transistors 214, 216, 218, 220 and 222. The transistors 214 and 216 are connected in series on a signal path 224 between a first voltage rail 226, e.g., a supply voltage (VDD) rail, and a second voltage rail 228, e.g., electrical ground (GND). The source of the transistor 214 is connected to the VDD rail 226, while the drain of the transistor 214 is connected to the drain of the transistor 216. The source of the transistor 216 is connected to ground 228. The gate or the control node of the transistor 214 is connected to receive a bias signal PBB. The gate of the transistor 216 is connected to the base of the phototransistor 212. The transistor 222 is connected between the base of the phototransistor 212 and ground 228. The gate of the transistor 222 is connected to receive a bias signal NBB. The transistors 218 and 220 are connected in series along with the phototransistor 212 on a signal path 230 between the VDD rail 226 and ground 228. The drain of the transistor 218 is connected to the VDD rail 226, while the source of the transistor 218 is connected to the drain of the transistor 220. The gate of the transistor 218 is connected to an INTN node 232, which is used to receive an integration or exposure signal INTN. The gate of the transistor 220 is connected to the signal path 224 between the transistors 214 and 216. The source of the transistor 220 is connected to the emitter of the phototransistor 212. The collector of the phototransistor 212 is connected to ground 228.

The phototransistor 212 is a photosensitive device configured to generate an electrical signal in the form of electrical current in response to impinging light. The transistors 214, 216 and 220 form a bias network that sets up a bias condition to maintain a stable base-to-collector voltage across the phototransistor 212 when the bias signal PBB is applied to the gate of the transistor 214. The transistor 222 operates to pre-bias the phototransistor 212 when the bias signal NBB is applied to its gate so that the phototransistor can more quickly respond to incident light. The transistor 218 operates as a switch to disconnect the phototransistor 212 from the positive voltage, such as the VDD rail 226 during an exposure period.

The light signal section 206 of the pixel 202 includes a reset transistor 234, transistors 236 and 238, a readout transistor 240 and a storage transistor 242. The reset transistor 234 is connected to a signal path 244 between a VRST node 246 and the gate of the storage transistor 242. The gate of the transistor 234 is connected to a reset signal line 248. The source and drain of the storage transistor 242 are connected to ground 228. The transistor 236 is connected between the signal path 230 between the transistors 218 and 220 and the signal path 244 between the transistors 234 and 242. The gate of the transistor 236 is connected to the INTN node 232. The transistors 238 and 240 are connected in series on a signal path 250 between the VDD rail 226 and an OUT node 252. The drain of the transistor 238 is connected to the VDD rail 226, while the source of the transistor 238 is connected to the drain of the transistor 240. The gate of the transistor 238 is connected to the signal path 244 between the transistors 234 and 242. The source of the transistor 240 is connected to the OUT node 252, while the gate of the transistor 240 is connected to a read signal line 254 connected to an RD node 256.

The storage transistor 242 is used as a storage device to store electrical charge produced by the phototransistor 212 in response to incident light during an exposure period. The reset transistor 234 is used to reset the storage transistor 242 for the next exposure period by connecting the gate of the storage transistor to VDD through the VRST node 246, as explained below. The transistor 236 is used to connect the gate of the storage transistor 242 to the phototransistor 212 during an exposure period. The transistor 238 is connected as a source follower with its gate connected to the gate of storage transistor 242 to provide a source voltage that corresponds to the amount of electrical signal stored in the storage transistor 242 for an exposure period. The readout transistor 240 is used to readout the source voltage of the transistor 238 as an image signal for a particular exposure period.

The dark signal section 208 of the pixel 202 includes transistors 234-1, 236-1, 238-1, 240-1 and 242-1, which are connected in a similar manner as the transistors 234, 236, 238, 240 and 242, respectively, of the light signal section 206. The differences between the transistors 234-1, 236-1, 238-1, 240-1 and 242-1 and the transistors 234, 236, 238, 240 and 242 include the gate of the transistor 236-1 being connected to the VDD rail 226 instead of the INTN node 246, the source of the transistor 234-1 being connected to a VRSTD node 258 and the source of the transistor 240-1 being connected to an OUTD node 260.

The NAND gate section 210 of the pixel 202 includes transistors 262, 264, 266 and 268. The source of the transistor 262 is connected to the VDD rail 226, while the drain of the transistor 262 is connected to the reset signal line 248. The gate of the transistor 262 is connected to a RST node 270, which is used to receive a reset signal RST. Similarly, the source of the transistor 264 is connected to the VDD rail 226, while the drain of the transistor 264 is connected to the reset signal line 248. The gate of the transistor 264 is connected to the read signal line 254. The transistors 266 and 268 are connected in series between the reset signal line 248 and ground 228. The drain of the transistor 266 is connected to the reset signal line 248, while the source of the transistor 266 is connected to the drain of the transistor 268. The gate of the transistor 266 is connected to the RST node 270. The source of the transistor 268 is connected to ground 228, while the gate of the transistor 266 is connected to the read signal line 254.

During an exposure period, the transistors 262 and 264 are turned on by applying low reset and read signals to the RST and RD nodes 270 and 256, respectively. During reset, a high signal is applied to the RST node 270 and all RD lines 256, which turns on the transistors 268 and 266. Consequently, a low signal is provided on the reset signal line 248, which turns on the reset transistors 234 and 234-1. During readout, a high read signal is applied to the read signal line 254 via the RD node 256, which turns on the readout transistors 240 and 240-1 to produce output signals on the output nodes 252 and 260.

Turning back to FIG. 1, the integration circuit 104 of the AGC system 100 includes inputs 118 and 120, switches 122 and 124, output transistors 126 and 128, current sources 130 and 132 and outputs 134 and 136. The input 118 is connected to the VRST nodes 246 of all the active pixels 114 in the image sensor 102. The switch 122 is connected between the VDD rail 226 and the input 118. The switch 122 is controlled by a control signal to selectively connect the VRST nodes 246 of all the active pixels 114 to the VDD rail 226 during an exposure period. The output transistor 126 and the current source 130 are connected in series on a signal path 138 between the VDD rail 226 and ground 228. The drain of the output transistor 126 is connected to the VDD rail 226, while the source of the transistor 126 is connected to the current source 130, which is connected to ground 228. The gate of the transistor 126 is connected to the input 118 to receive a combined signal of VRST signals on the VRST nodes 246 of all the active pixels 114 in the image sensor 102. The combined signal of VRST signals is represented as C_VRST in FIG. 1. The output 134 is connected to the signal path 138 between the output transistor 126 and the current source 130. Since the output transistor 126 is connected as a source follower with its gate connected to the input, the output transistor 126 provides a source voltage that corresponds to the C_VRST signal on the input 118. This source voltage is presented on the output 134 as an output signal, which is indicated as the FRST signal in FIG. 1.

The other input 120 of the integration circuit 104 is connected to the VRSTD nodes 258 of all the active pixels 114 in the image sensor 102. The switch 124 is connected between the VDD rail 226 and the input 120. The switch 124 is also controlled by a control signal to selectively connect the VRSTD nodes 258 of all the active pixels 114 to the VDD rail 226 during an exposure period. The output transistor 128 and the current source 132 are connected in series on a signal path 140 between the VDD rail 226 and ground 228. The drain of the output transistor 128 is connected to the VDD rail 226, while the source of the output transistor 128 is connected to the current source 132, which is connected to ground 228. The gate of the output transistor 128 is connected to the input 120 to receive the combined signal of VRSTD signals on the VRSTD nodes 258 of all the active pixels 114 in the image sensor 102. The combined signal of VRSTD signals is represented as C_VRSTD in FIG. 1. The output 136 is connected to the signal path 140 between the output transistor 128 and the current source 132. Since the output transistor 128 is connected as a source follower with its gate connected to the input 120, the output transistor 128 provides a source voltage that corresponds to the C_VRSTD signal on the input 120. This source voltage is presented on the output as an output signal, which is indicated as the FRSTD signal in FIG. 1.

The outputs 134 and 136 of the integration circuit 104 are connected to the comparison block 106. The comparison block 106 includes a level shift 142, which is set by reference voltage Vih. The reference voltage is chosen for the desired average integrated voltage for the pixel array 112. The reference voltage could be fixed or be varied for different general surface categories. The level shift 142 introduces the reference voltage Vih to the FRSTD signal to produce a threshold signal. Thus, the FRSTD signal and the reference voltage Vih are components of the threshold signal. The comparison block 106 is configured to trip when the FRST signal integrates down to a desired threshold, which is represented by the threshold signal. Thus, the comparison block 106 is configured to compare the FRST signal with the threshold signal. The duration for the combined FRST signal to become equal to the threshold signal is measured using the counter 108. The comparison block 106 produces an output signal TAVG, which indicates when the comparison condition is met. The output of the comparison block 106 is connected to the controller 110, which monitors the comparison block output and stops the counter 108 when the comparison block trips. The counter value derived from the counter 108 is then used to derive a shutter value for subsequent image capture. In an embodiment, the resulting counter value is directly used as the shutter value. In other embodiments, the resulting counter value may be modified to produce a desired transfer function between the counter value and the shutter value used for image capture. In this fashion, the amount of accumulated electrical signal stored in the storage transistors 242 of the active pixels 114 in the image sensor 102 is used for both AGC and image capture, thereby ensuring the shutter value acquired by the AGC system 100 will yield the desired exposure.

Figure 3:
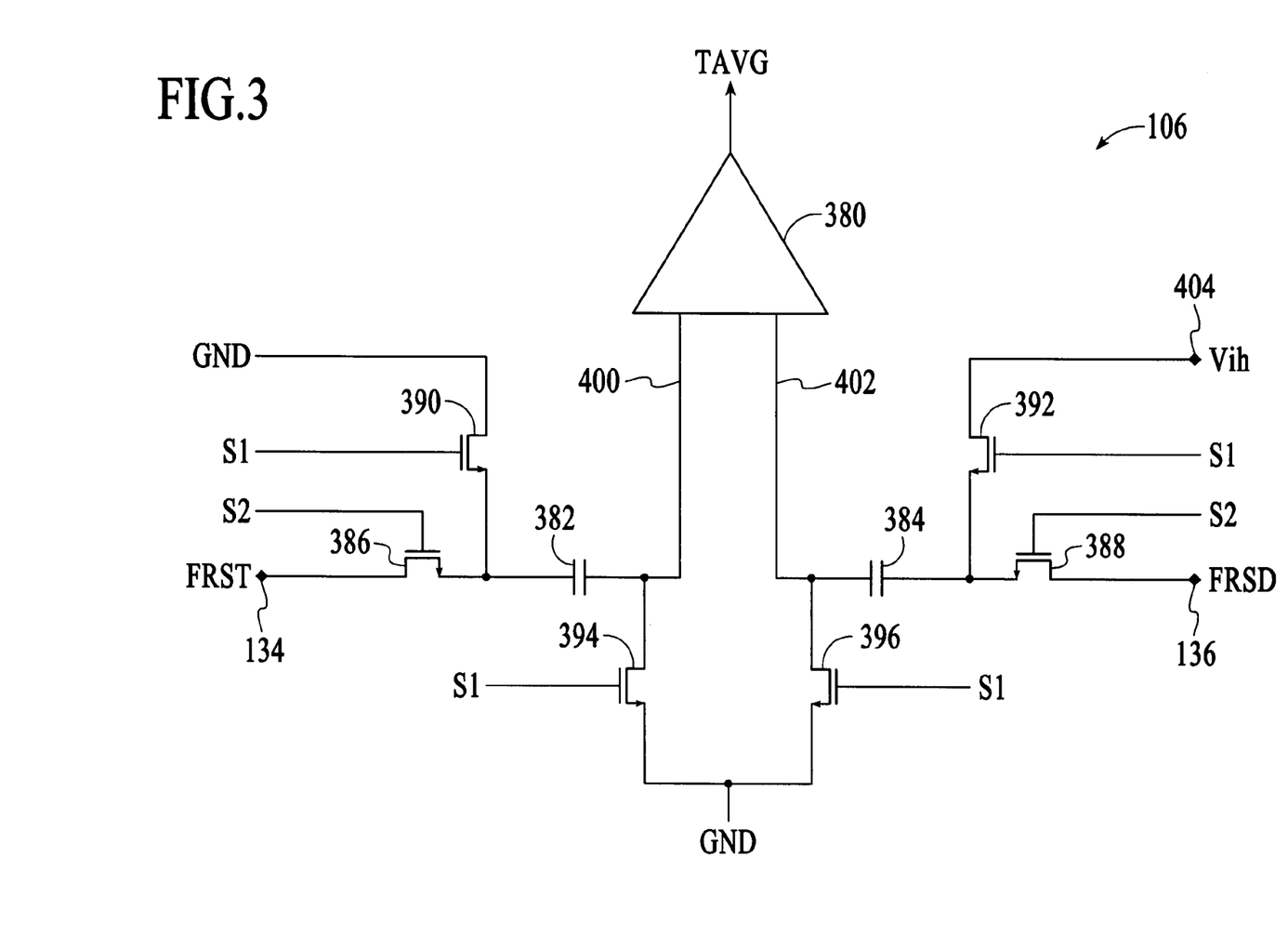
FIG. 3 is a circuit diagram of a comparison block of the AGC system in accordance with an embodiment of the invention.

Turning now the FIG. 3, the comparison block 106 with the level shift 142 in accordance with an embodiment of the invention is shown. The comparison block 106 includes a comparator 380, capacitors 382 and 384 and transistor 386, 388, 390, 392, 394 and 396. The comparator 380 includes two inputs 400 and 402, where comparison signals are applied. The capacitor 382 and the transistors 386, 390 and 394 operate to provide the FRST signal to the input 400 of the comparator 380 as one of the comparison signals. The transistor 386 and the capacitor 382 are connected in series between the output 134 of the integration circuit 104 and the input 400 of the comparator 380. The transistor 390 is connected between ground and a node, which is located between the transistor 386 and the capacitor 382. The transistor 390 is controlled by an S1 signal, while the transistor 386 is controlled by an S2 signal. The S1 and S2 signal are non-overlapping clock signals. The transistor 394 is connected between ground and a node, which is located between the capacitor 382 and the input 400 of the comparator 380. The transistor 394 is also controlled by the S1 signal.

Similarly, the capacitor 384 and the transistors 388, 392 and 396 operate to provide the other comparison signal based on the FRSTD signal and the reference voltage Vih to the input 402 of the comparator 380. The transistor 388 and the capacitor 384 are connected in series between the output 136 of the integration circuit 104 and the input 402 of the comparator 380. The transistor 388 is controlled by the S2 signal. The transistor 392 is connected between a terminal 404 and a node, which is located between the transistor 388 and the capacitor 384. The terminal 404 is where the reference voltage Vih is applied. The transistor 392 is controlled by the S1 signal. The transistor 396 is connected between ground and a node, which is located between the capacitor 384 and the input 402 of the comparator 380. The transistor 396 is also controlled by the S1 signal.

The comparison block 106 operates in the following manner. Initially, a high S1 signal is applied to the transistors 390, 392, 394 and 396, turning on these transistors, and a low S2 signal is applied to the transistors 386 and 388, turning off these transistors. Consequently, no voltage is stored across the capacitor 382 and the reference voltage Vih is stored across the capacitor 384. Furthermore, both of the inputs 400 and 402 are grounded by the transistors 394 and 396. Next, a low S1 signal is applied to the transistors 390, 392, 394 and 396, turning off these transistors, and a high S2 signal is applied to the transistors 386 and 388, turning on these transistors. Consequently, the inputs 400 and 402 of the comparator 380 are released from ground, and the capacitors 382 and 384 are connected to the integration circuit outputs 134 and 136, respectively. Thus, the FRST signal is applied to the capacitor 382 via the integration circuit output 134, and the FRSTD signal is applied to the capacitor 384 via the integration circuit output 136. The use of the capacitors 382 and 384 to build in an offset voltage of Vih to the comparison block 106 causes the desired effect of allowing the C_VRST signal to integrate down until the desired offset voltage between the C_VRST signal and C_VRSTD has been reached, which causes the comparator 380 to trip.

Figure 4:
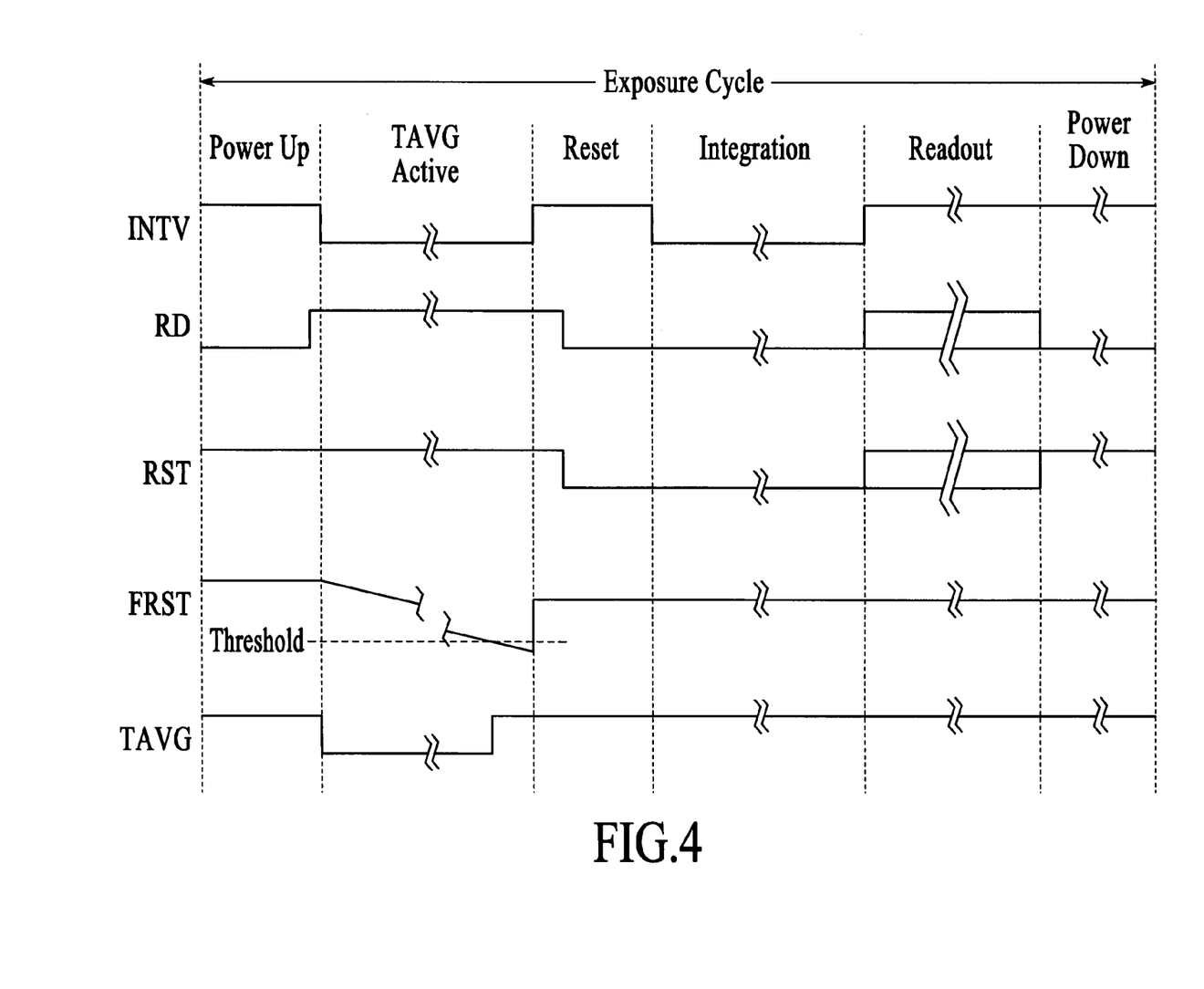
FIG. 4 is a timing diagram of various signals used in the AGC system in accordance with an embodiment of the invention.

Turning now to FIG. 4, a timing diagram for the different signals used in the AGC system 100 is shown. During the power up period, the INTN and RST signals are set high, while the RD signal is set low. In addition, a high S1 signal and a low S2 signal are applied to the comparison block 106 to prepare for the comparison of the FRST and FRSTD signals. Near the end of the power up period, the RD signal is switched to high to extract the VRST and VRSTD signals from all the active pixels 114 in the image sensor 102 to produce the FRST and the FRSTD signals, which are transmitted to the comparison block 106.

During the TAVG active period, the switches 122 and 124 of the integration circuit 104 are opened so that the C_VRST and C_VRSTD signals will integrate down from their initial states. During this period, the FRST signal that corresponds to the C_VRST signal and the FRSTD signal that corresponds to the C_VRSTD signal are applied to the comparator 106, and the counter 108 is activated. In addition, a low S1 signal and a high S2 signal are applied to the comparison block 106 to release the inputs 400 and 402 of the comparator 380 from ground and to connect them to the capacitors 382 and 384, respectively, which are now connected to receive the FRST and FRSTD signals, respectively. The TAVG signal from the comparator 106 remains low until the FRST signal reaches the desired threshold signal, which is defined by the FRSTD signal and the reference voltage Vih. When the comparator 380 trips and the TAVG signal turns high, the counter 108 is stopped and the resulting counter value is used as the shutter value for subsequent image capture. In this manner, new shutter values can be continuously acquired by the AGC system 100 that conform to changing conditions with respect to image capture to ensure that proper exposure periods will be used to capture subsequent images.

During the reset period, the INTN, RD and RST signals are set high to reset the pixels 114 and 116 of the image sensor 102. In addition, the switches 122 and 124 of the integration circuit 104 are closed so that the VRST and VRSTD signals in the pixels 114 and 116 of the image sensor 102 are pulled to VDD. Furthermore, a high S1 signal and a low S2 signal are applied to the comparison block 106 to connect the inputs 400 and 402 of the comparator 380 to ground and reset the voltages stored in the capacitors 382 and 384. The RST signal is then set low to prepare for the integration.

During the integration period, the INTN signal is set low to allow the storage transistor 242 of each active pixel 114 to accumulate electrical charge that correspond to the electrical charge generated by the phototransistor 212 in response to incident light.

During the readout period, the RD and RST signals are selectively switched to high to readout the output signals from each of the active pixels 114 of the image sensor 102. In an implementation, a row of active pixels 114 is first selected and then each column of active pixels is sequentially selected to readout the output signals from the active pixels on the selected row.

During the power down period, the INTN and RST signals are set high, while the RD signal is set low.

Figure 5:
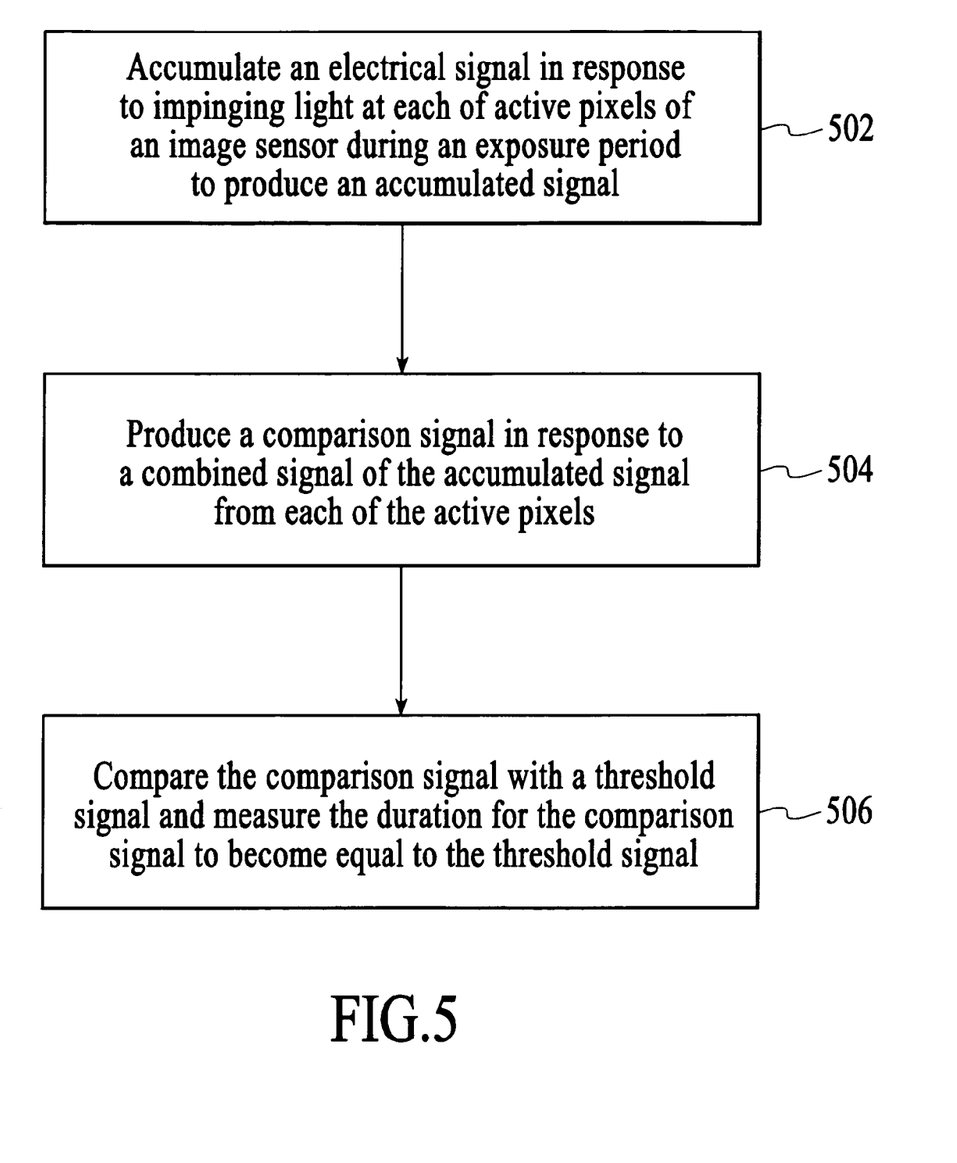
FIG. 5 is a flow diagram of a method for providing AGC in an imaging device in accordance with an embodiment of the invention.

A method for providing automatic gain control in an imaging device in accordance with an embodiment of the invention is described with reference to FIG. 5. At block 502, an electrical signal in response to impinging light at each of active pixels of an image sensor during an exposure period is accumulated to produce an accumulated signal. At block 504, a comparison signal in response to a combined signal of the accumulated signal from each of the active pixels is produced. At block 506, the comparison signal is compared with a threshold signal. In addition, the duration for the comparison signal to become equal to the threshold signal is measured. The measured duration is used to derive a shutter value for subsequent image capture.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An automatic gain control system for an imaging device comprising:
   an image sensor with a plurality of active pixels, each of said active pixels comprising:
      a photosensitive device configured to generate an electrical signal in response to impinging light; and
      a storage device electrically connected to said photosensitive device to store an accumulated signal of said electrical signal during an exposure period;
   an integration circuit including an output transistor electrically connected to said storage device of each of said active pixels to receive a combined signal of said accumulated signal stored in said storage device of each of said active pixels, said output transistor being connected to produce a comparison signal corresponding to said combined signal, wherein said output transistor of said integration circuit is connected in series with a current source on a signal path between a first voltage rail and a second voltage rail;
   a comparator connected to said integration circuit to receive said comparison signal, said comparator being configured to compare said comparison signal with a threshold signal; and a counter operably connected to said comparator, said counter being configured to measure the duration for said comparison signal to become equal to said threshold signal, said duration being used to derive a shutter value for subsequent image capture.

2. The system of claim 1 wherein said storage device is a storage transistor, a control node of said storage transistor being connected to said output transistor of said integration circuit.

3. The system of claim 1 wherein said output transistor of said integration circuit is connected as a source follower.

4. The system of claim 3 wherein a control node of said output transistor of said integration circuit is connected to said storage device of each of said active pixels, said control node being further connected to said first voltage rail via a switch.

5. A method for providing automatic gain control in an imaging device, said method comprising:
    accumulating an electrical signal in response to impinging light at each of active pixels of an image sensor during an exposure period to produce an accumulated signal;
    accumulating a reference signal at each of said active pixels of said image sensor during said exposure period;
    producing a comparison signal in response to a combined signal of said accumulated signal from each of said active pixels;
    producing a second comparison signal in response to a combined reference signal of said reference signal from each of said active pixels, said combined reference signal being a component of a threshold signal; and
    comparing said comparison signal with the threshold signal, including measuring the duration for said comparison signal to become equal to said threshold signal, said duration being used to derive a shutter value for subsequent image capture.

6. The method of claim 5 wherein said accumulating said electrical signal includes accumulating said electrical signal in a storage transistor.

7. The method of claim 5 wherein said producing said comparison signal includes applying said combined signal to a control node of an output transistor, said control node of said output transistor being electrically connected to each of said active pixels of said image sensor.

8. The method of claim 5 further comprising introducing a fixed reference signal to said second comparison signal to produce said threshold signal.

9. An automatic gain control system for an imaging device comprising:
    an image sensor with a plurality of active pixels, each of said active pixels comprising:
        a phototransistor configured to generate an electrical signal in response to impinging light;
        a storage transistor electrically connected to said phototransistor to store an accumulated signal of said electrical signal during an exposure period; and
        a reference storage transistor to store a reference signal during said exposure period;
    an integration circuit including an output transistor electrically connected to said phototransistor of each of said active pixels to receive a combined signal of said accumulated signal stored in said storage transistor of each of said active pixels, said output transistor being connected to produce a comparison signal corresponding to said combined signal;
    a comparator connected to said integration circuit to receive said comparison signal, said comparator being configured to compare said comparison signal with a threshold signal; and
    a counter operably connected to said comparator, said counter being configured to measure the duration for said comparison signal to become equal to said threshold signal, said duration being used to derive a shutter value for subsequent image capture.

10. The system of claim 9 wherein said output transistor is connected as a source follower, the gate of said output transistor being connected to the gate of said storage transistor of each of said active pixels of said image sensor.

11. The system of claim 9 wherein said integration circuit includes a second output transistor electrically connected to said reference storage transistor of each of said active pixels to receive a combined reference signal of said reference signal stored in said reference storage transistor of each of said active pixels, said second output transistor being connected to produce a second comparison signal corresponding to said combined reference signal, said combined reference signal being a component of said threshold signal.

12. The system of claim 11 wherein said comparator includes a level shift to introduce a fixed reference signal to said combined reference signal to produce said threshold signal.

13. An automatic gain control system for an imaging device comprising:
    an image sensor with a plurality of active pixels, each of said active pixels comprising:
        a photosensitive device configured to generate an electrical signal in response to impinging light;
        a storage device electrically connected to said photosensitive device to store an accumulated signal of said electrical signal during an exposure period; and
        a reference storage device to store a reference signal during said exposure period;
    an integration circuit including an output transistor electrically connected to said storage device of each of said active pixels to receive a combined signal of said accumulated signal stored in said storage device of each of said active pixels, said output transistor being connected to produce a comparison signal corresponding to said combined signal;
    a comparator connected to said integration circuit to receive said comparison signal, said comparator being configured to compare said comparison signal with a threshold signal; and
    a counter operably connected to said comparator, said counter being configured to measure the duration for said comparison signal to become equal to said threshold signal, said duration being used to derive a shutter value for subsequent image capture.

14. The system of claim 13 wherein said integration circuit includes a second output transistor electrically connected to said reference storage device of each of said active pixels to receive a combined reference signal of said reference signal stored in said reference storage device of each of said active pixels, said second output transistor being connected to produce a second comparison signal corresponding to said combined reference signal, said combined reference signal being a component of said threshold signal.

15. The system of claim 14 wherein said second output transistor of said integration circuit is connected in series with a second current source on a second signal path between a first voltage rail and a second voltage rail.

16. The system of claim 14 wherein said comparator includes a level shift to introduce a fixed reference signal to said combined reference signal to produce said threshold signal.

* * * * *